United States Patent [19]

Kataoka

[11] Patent Number: 4,547,057
[45] Date of Patent: Oct. 15, 1985

[54] FLASH PHOTOGRAPHIC APPARATUS

[75] Inventor: Hiroyuki Kataoka, Tokyo, Japan

[73] Assignee: Canon Kabushiki Kaisha, Tokyo, Japan

[21] Appl. No.: 565,617

[22] Filed: Dec. 27, 1983

[30] Foreign Application Priority Data

Dec. 29, 1982 [JP] Japan .................. 57-231512

[51] Int. Cl.[4] .............................. G03B 7/097
[52] U.S. Cl. .................. 354/415; 354/483; 354/475
[58] Field of Search ............... 354/413, 414, 415, 416, 354/418, 421, 423, 482, 483, 419; 315/241 P

[56] References Cited
U.S. PATENT DOCUMENTS 4,460,263 7/1984 Gfeller et al. ................ 354/415

Primary Examiner—L. T. Hix
Assistant Examiner—David M. Gray
Attorney, Agent, or Firm—Toren, McGeady, Stanger, Goldberg & Kiel

[57] ABSTRACT

In a flash photography apparatus of the type determining an aperture for flash photography based on an integrated value of the reflected light quantity received from an object to be photographed as a result of pre-flashing, the quantity of light received is reduced when the integrated value thereof reaches a predetermined value. Then, the quantity of light received as a result of pre-flashing performed thereafter is integrated and the aperture is determined on the basis of the above integrated value and a signal indicating that the integrated value of the light quantity received has reached a predetermined value.

21 Claims, 10 Drawing Figures

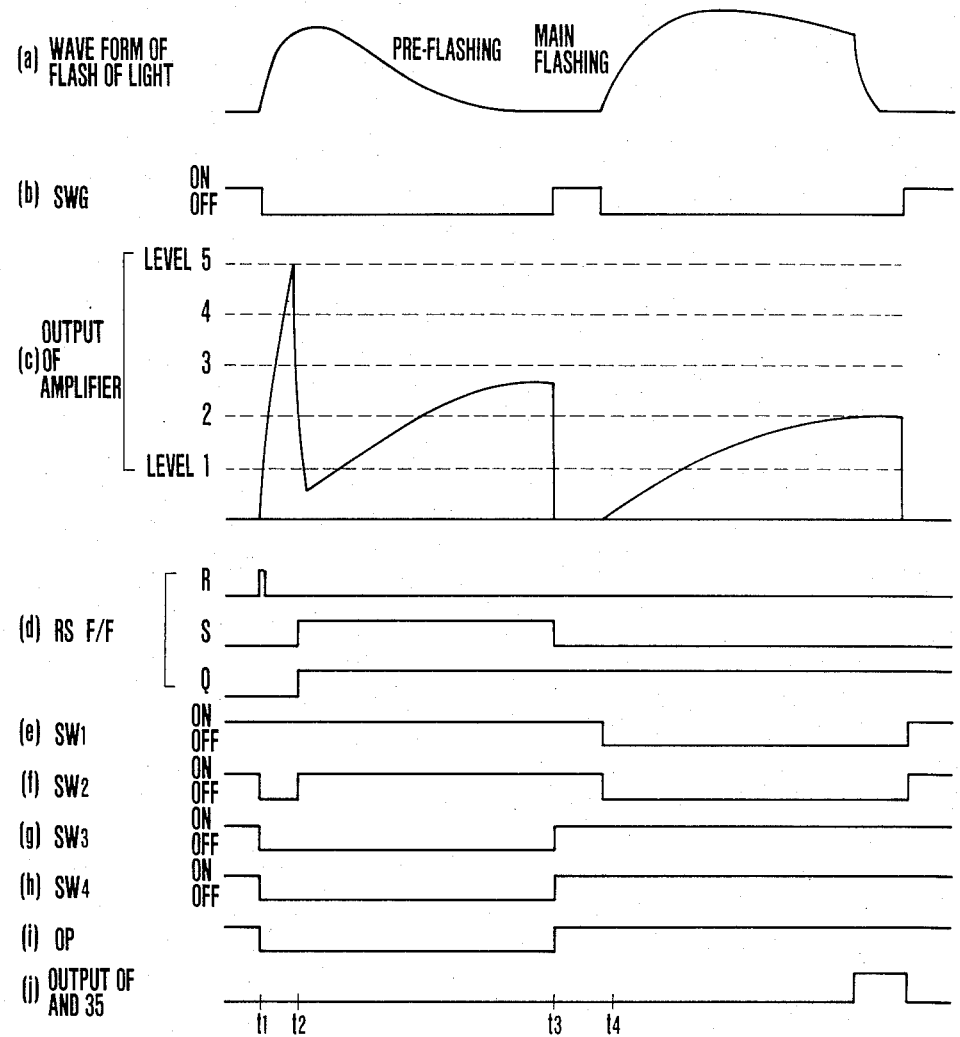

FIG.3(a)

| OUTPUT OF OPERATIONAL AMPLIFIER 2 \ OUTPUT OF A-D CONVERTER CKT | D1 | D2 | D3 | D4 | D5 |
|---|---|---|---|---|---|
| LEVEL 5 AND ABOVE | 1 | 1 | 1 | 1 | 1 |
| LEVEL BETWEEN 4 AND 5 | 1 | 1 | 1 | 1 | 0 |
| LEVEL BETWEEN 4 AND 3 | 1 | 1 | 1 | 0 | 0 |
| LEVEL BETWEEN 3 AND 2 | 1 | 1 | 0 | 0 | 0 |
| LEVEL BETWEEN 2 AND 1 | 1 | 0 | 0 | 0 | 0 |
| LEVEL 1 AND BELOW | 0 | 0 | 0 | 0 | 0 |

FIG.3(b)

| OUTPUT OF FF8 | A-D CONVERTER CKT | | | | | DECODER | APERTURE VALUE |
|---|---|---|---|---|---|---|---|
| | D1 | D2 | D3 | D4 | D5 | | |
| 0 | 0 | 0 | 0 | 0 | 0 | $Q_0=1$ | F 1 |
| | 1 | 0 | 0 | 0 | 0 | $Q_1=1$ | F 1.4 |
| | 1 | 1 | 0 | 0 | 0 | $Q_2=1$ | F 2 |
| | 1 | 1 | 1 | 0 | 0 | $Q_3=1$ | F 2.8 |
| | 1 | 1 | 1 | 1 | 0 | $Q_4=1$ | F 4 |
| 1 | 0 | 0 | 0 | 0 | 0 | $Q_5=1$ | F 5.6 |
| | 1 | 0 | 0 | 0 | 0 | $Q_6=1$ | F 8 |
| | 1 | 1 | 0 | 0 | 0 | $Q_7=1$ | F 11 |
| | 1 | 1 | 1 | 0 | 0 | $Q_8=1$ | F 16 |
| | 1 | 1 | 1 | 1 | 0 | $Q_9=1$ | F 22 |
| | 1 | 1 | 1 | 1 | 1 | $Q_{10}=1$ | F 32 |

FIG.3(c)

| OUTPUT OF OPERATIONAL AMPLIFIER | RECEIVED LIGHT QUANTITY LEVEL | LEVEL | A-D CONVERSION OUTPUT | | | | | |
|---|---|---|---|---|---|---|---|---|
| | | | D1 | D2 | D3 | D4 | D5 | |
| V1 | E1 | LEVEL 1 BELOW 1 | 0 | 0 | 0 | 0 | 0 | I |
| V1 | E1 | LEVEL 1 | 1 | 0 | 0 | 0 | 0 | I |
| 2V1 | 2E1 | LEVEL 2 | 1 | 1 | 0 | 0 | 0 | I |
| 4V1 | 4E1 | LEVEL 3 | 1 | 1 | 1 | 0 | 0 | I |
| 8V1 | 8E1 | LEVEL 4 | 1 | 1 | 1 | 1 | 0 | I |
| 16V1=1/2 V1 | 16E1 | LEVEL 5 (LEVEL BELOW 1) | 0 | 0 | 0 | 0 | 0 | II |
| V1 | 32E1 | LEVEL 1 | 1 | 0 | 0 | 0 | 0 | II |
| 2V1 | 64E1 | LEVEL 2 | 1 | 1 | 0 | 0 | 0 | II |
| 4V1 | 128E1 | LEVEL 3 | 1 | 1 | 1 | 0 | 0 | II |
| 8V1 | 256E1 | LEVEL 4 | 1 | 1 | 1 | 1 | 0 | II |
| 16V1 | 512E1 | LEVEL 5 | 1 | 1 | 1 | 1 | 1 | II |

FIG.3(d)

| APERTURE VALUE | OR GATE PRODUCING "1" | AND GATE SELECTED | LEVEL | OUTPUT OF OPERATIONAL AMPLIFIER | RECEIVED LIGHT QUANTITY LEVEL |
|---|---|---|---|---|---|
| F 1 | O1 | A1 | LEVEL 1 | V1 | E1 |
| F 1.4 | O1 | A1 | LEVEL 1 | V1 | E1 |
| F 2 | O2 | A2 | LEVEL 2 | 2V1 | 2E1 |
| F 2.8 | O3 | A3 | LEVEL 3 | 4V1 | 4E1 |
| F 4 | O4 | A4 | LEVEL 4 | 8V1 | 8E1 |
| F 5.6 | O5 | A5 | LEVEL 5 | 16V1 | 16E1 |
| F 8 | O1 | A1 | LEVEL 1 | V1 | 32E1 |
| F 11 | O2 | A2 | LEVEL 2 | 2V1 | 64E1 |
| F 16 | O3 | A3 | LEVEL 3 | 4V1 | 128E1 |
| F 22 | O4 | A4 | LEVEL 4 | 8V1 | 256E1 |
| F 32 | O5 | A5 | LEVEL 5 | 16V1 | 512E1 |

FIG.3(e)

| OUTPUT OF COUNTER 10 | APERTURE VALUE |
|---|---|
| $Q_0' = 1$ | F 1 |
| $Q_1' = 1$ | F 1.4 |
| $Q_2' = 1$ | F 2 |
| $Q_3' = 1$ | F 2.8 |
| $Q_4' = 1$ | F 4 |
| $Q_5' = 1$ | F 5.6 |
| $Q_6' = 1$ | F 8 |
| $Q_7' = 1$ | F 11 |
| $Q_8' = 1$ | F 16 |
| $Q_9' = 1$ | F 22 |
| $Q_{10}' = 1$ | F 32 |

FIG.3(f)

| OUTPUT OF OPERATIONAL AMPLIFIER 2 | APERTURE VALUE | OUTPUT OF A-D COUNTER CKT | | | | | OUTPUT OF DECODER |
|---|---|---|---|---|---|---|---|
| | | D1 | D2 | D3 | D4 | D5 | |
| LEVEL BETWEEN 1 AND 2 | F8 | 1 | 0 | 0 | 0 | 0 | $Q_6 = 1$ |
| LEVEL BETWEEN 2 AND 3 | F11 | 1 | 1 | 0 | 0 | 0 | $Q_7 = 1$ |
| LEVEL BETWEEN 3 AND 4 | F16 | 1 | 1 | 1 | 0 | 0 | $Q_8 = 1$ |
| LEVEL BETWEEN 4 AND 5 | F22 | 1 | 1 | 1 | 1 | 0 | $Q_9 = 1$ |
| LEVEL ABOVE 5 | F32 | 1 | 1 | 1 | 1 | 1 | $Q_{10} = 1$ |

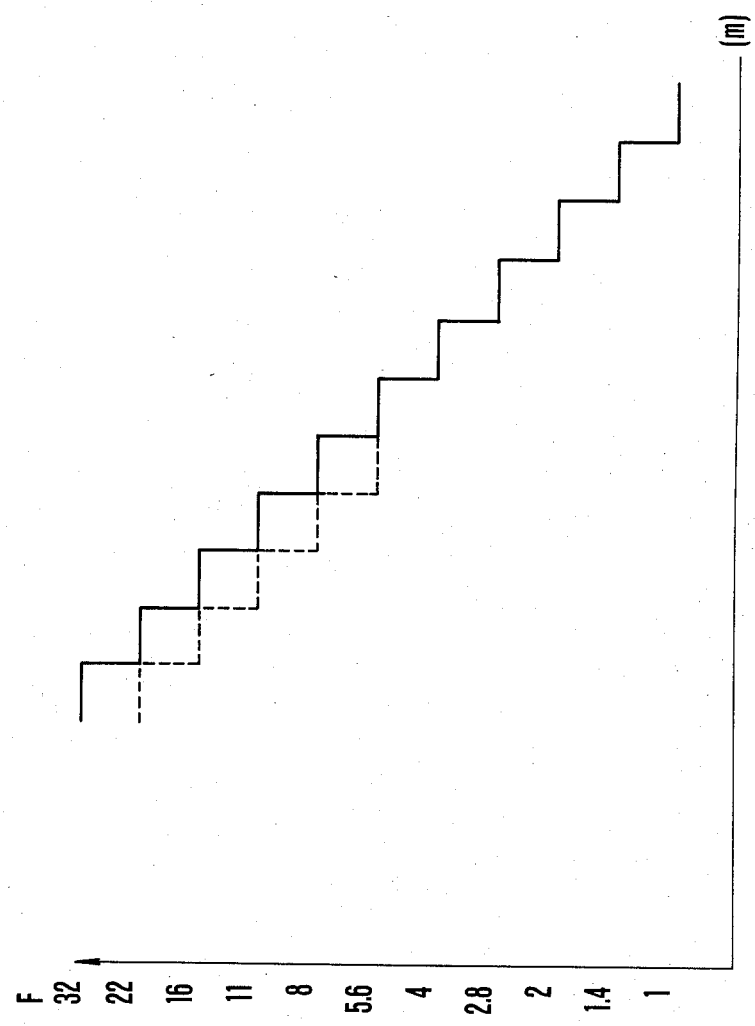

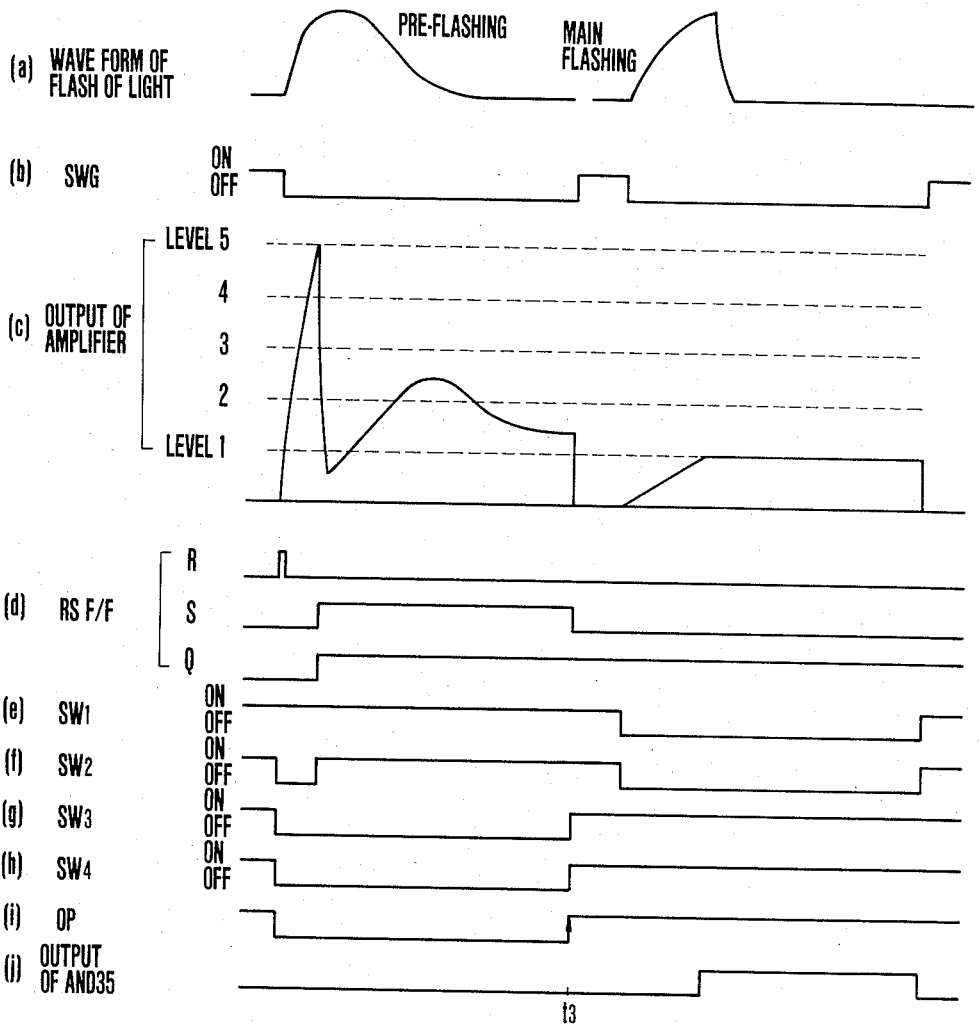

FLASH PHOTOGRAPHIC APPARATUS

BACKGROUND OF THE INVENTION

1. Field of the Invention

This invention relates to a flash photography apparatus in which object distance is detected by pre-flashing and an aperture value is determined appositely to the detected object distance having the aperture of a stop controlled depending on to the aperture value.

2. Description of the Prior Art

In the above conventional flash photography apparatus, as disclosed in, for example, U.S. patent application Ser. No. 444,214, 447,508 and 452,875, reflected light quantity received from the object to be photographed as a result of pre-flashing is integrated by means of an integration circuit. Then, the integrated value of the received light quantity is converted into a digital value indicating object distance in a digital value and aperture value is determined based on the digital value which can be expressed as a function of the object distance.

The varying rate of the received light quantity resulting from pre-flashing relative to variation in object distance is such that it varies two-fold every time the object distance varies by $\sqrt{2}$ times. Therefore, arrangements to detect different object distances over a wide range would result in extremely great variations in the output of the above integration circuit. Then, an A-D converter, which is required to convert the output of the integration circuit into a digital value, must have a wide dynamic range for the input thereof in order to obtain a sufficiently high degree of resolution. Such an A-D converter would inevitably necessitate an increase in size. Meanwhile, the flash photography apparatus generally has a limited space, which prevents a large A-D converter from being incorporated therein. As a result, the A-D conversion of object distance values has a very low degree of resolution roughly dividing the object distance range into far, medium and close distances. Therefore, the aperture values that are the determined according to the object distance have only been designated in three steps.

It is therefore a general object of the present invention to solve the above problem of the prior art. A more specific object of the invention is to provide a flash photography apparatus of the above kind, wherein: The output of an integration circuit, which integrates reflected light quantity received from an object to be photographed as a result of pre-flashing, is A-D (analog-to-digital) converted. Then, when the A-D converted value or integrated value is above a predetermined value, the output of the integration circuit is varied and is again A-D converted by the A-D converter. An aperture value suitable for flash photography is designated based on the second A-D conversion value and also a signal indicating of that the result of the first A-D conversion or the original integrated value has exceeded the predetermined value. The resolution of the apparatus is thus enhanced, permitting selection of one aperture value from many designatable aperture values for a wide range of object distances employed with a relatively small, low resolution A-D converter.

Another object of the invention is to provide a flash photography apparatus of the above kind, wherein: The integration output of an integration circuit produced during a preliminary distance measuring process is detected by detecting means which produces a detection output when the integration output reaches a predetermined level. Level reducing means which reduces the integration output, depending on the detection output, transmits the reduced integration output to an A-D converter. An aperture value is determined and designated based on the A-D converted value of the integration output obtained at the end of the preliminary distance measuring process when the integration output does not reach the predetermined level. However, the aperture value is determined and designated based on the A-D converted value of the integration output which is obtained at the end of the preliminary distance measurement and also the detection output when the detection output is produced during the preliminary distance measuring process. Therefore, an aperture value can be selected from many aperture values designatably stepped over a wide range depending on the object distance even when the A-D converter has a low dynamic level value.

A further object of the invention is to provide a flash photography apparatus of the above kind, wherein: When the integration output of an integration circuit reaches a predetermined level during an integrating action on received reflected light resulting from pre-flashing, the output of the integration circuit is reduced at that time with the integration circuit gain shifted (increased) by, for example, shifting the integrating capacity of the integration circuit. Then, information on the gain shift is stored. The above integrating action is further performed from the reduced integration output. The aperture is solely determined by the A-D converted value of the integration output obtained at the end of the integrating action when the above gain shifting is not performed before the end of the integrating action. It is determined based on both the A-D converted value of the integration output obtained at the end of the integrating action and the above gain shift information when the gain shifting action is performed before the end of the integrating action. This arrangement permits enhancement of the resolution of the A-D converter over a wide range of object distances, so that aperture values can be designated for a wide range of object distances even if the dynamic range of the A-D converter in use is low.

It is still a further object of the invention to provide a flash photography apparatus in which: During the process of pre-flashing, when the integrated value of the reflected light quantity received from an object to be photographed reaches a predetermined value, a detection output is produced. Then, the above integrated value is reduced in response to the detection output. The integrating action on the reflected light quantity is then further performed from that reduced. An aperture value is determined solely on the basis of the integrated value of the reflected light quantity if the detection output is not produced during the pre-flashing process and is determined based on both the detection output and the integrated value of reflection light quantity if the detection output is produced during the process of pre-flashing.

It is another object of the invention to provide a flash photography apparatus which operates in a first mode of automatically setting a flash photography aperture value by pre-flashing and in a second mode of permitting manual setting of the flash photography aperture value in the following manner: When the aperture value is manually set in the second mode, the aperture is controlled based on the aperture value determined in the first mode instead of the manually set aperture value, if the manually set value is smaller than the value determined by the first mode. Therefore, the aperture can be appropriately controlled even when the aperture value is inappositely set in the second mode.

An additional object of the invention is to provide a flash photography apparatus which permits synchronization of daylight flash photography by determining an aperture value based on the brightness when the brightness of an object to be photographed is greater than a predetermined value.

SUMMARY OF THE INVENTION

A flash photography apparatus of a kind which performs pre-flashing before flash photography, receives a reflected light from an object to be photographed as a result of pre-flashing and determines a flash photography aperture value based on the quantity of reflected light received. The apparatus includes a light sensitive element which receives the reflected light resulting from pre-flashing, a detection signal forming circuit which detects the light quantity received by the light sensitive element and produces a detection signal when the received light quantity exceeds a predetermined value. The apparatus also includes reducing means for lowering, in response to the detection signal, the value of the light quantity received by the light sensitive element. An aperture determining circuit determines an aperture value based on the detection signal and the quantity of light received by the light sensitive element and lowered by the reducing means.

These and further objects and features of the invention will become apparent from the following detailed description of a preferred embodiment thereof taken in conjunction with the accompanying drawings.

BRIEF DESCRIPTION OF THE DRAWINGS

FIG. 2 is a wave form chart showing a first operation mode of the same embodiment.

FIGS. 3(a)–3(f) are tables showing the operation in the same embodiment of FIG. 1

FIG. 4 is a graph showing aperture values controllable in the embodiment of FIG. 1.

FIG. 5 is a wave form chart showing the operation as performed in a daylight synchronized flash photographic mode in the embodiment of FIG. 1.

DETAILED DESCRIPTION OF THE PREFERRED EMBODIMENT

Figure 1:
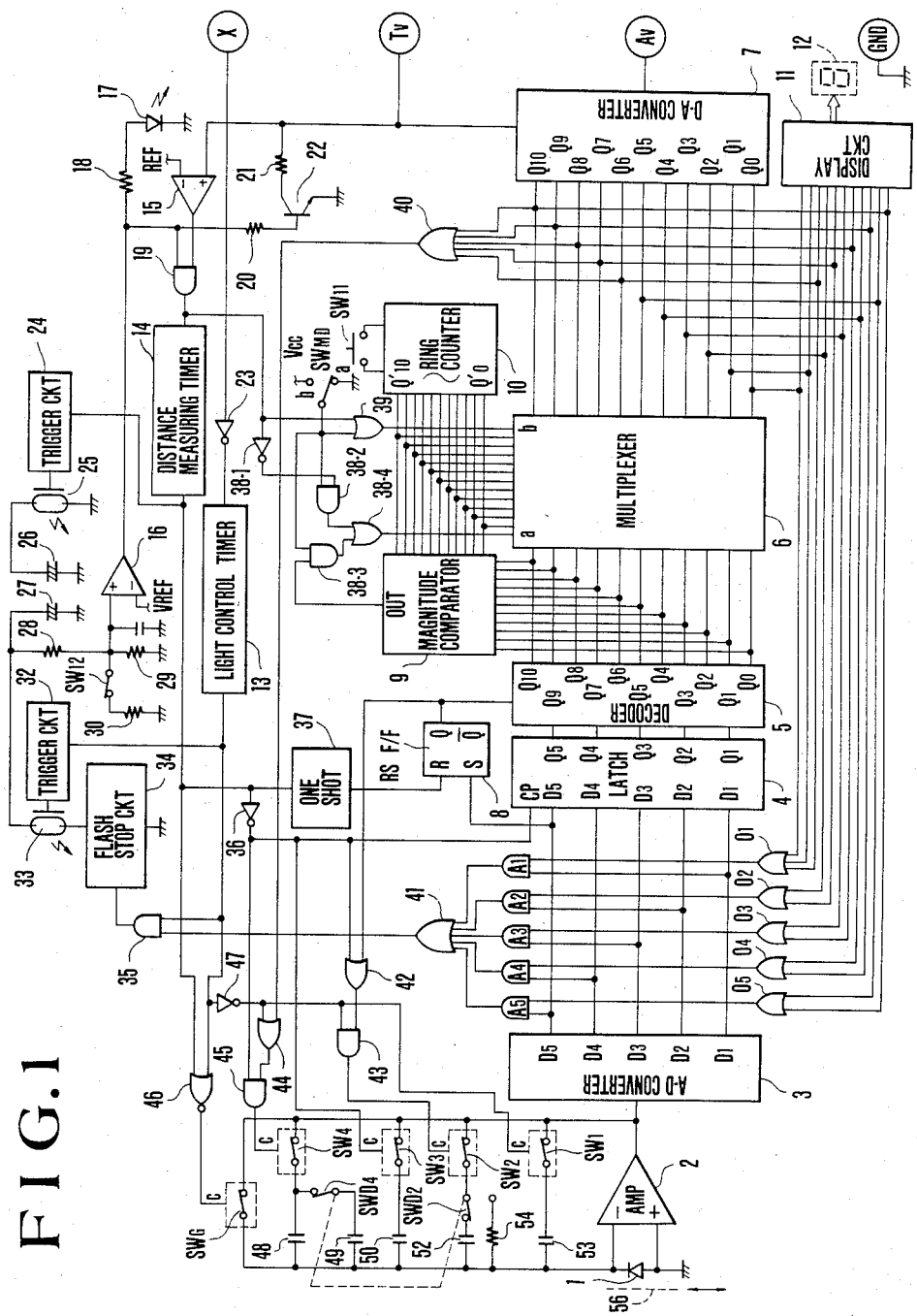
FIG. 1 is a circuit diagram showing a flash photography apparatus in an embodiment of the present invention.

FIG. 1 is a circuit diagram of a flash photography apparatus according to the present invention. This embodiment includes a light sensitive element 1. A filter 56 for setting film sensitivity is disposed in front of the light sensitive element 1. The light sensitive element 1 is connected between the input terminals of an operational amplifier 2 (hereinafter called OP amp for short). Between the input and output terminals of the OP amp 2 are disposed capacitors 53, 52, 50, 48 and 49 which are selectively connected to the OP amp 2. The capacitors 53 and 52 are integrating capacitors and are connected to the OP amp 2 forming a Miller integrator when action preliminary distance measuring action is to be performed with pre-flashing. The capacitors 48–50 are integrating capacitors for light control and are connected to the OP amp 2 forming a Miller integrator for light control when action light control action is to be performed with main flashing. The capacity values of these capacitors 53 and 52 are set in the ratio 1:31. The capacity value of the capacitor 50 and those of the capacitors 48 and 49, at the time of parallel connection, are also set in the ratio of 1:31. An analog switch SW1 is composed of a switching element such as an FET or a transistor, etc. and connects the above capacitor 53 to the OP amp 2. The switch SW1 turns on when a signal supplied to its control input terminal C is at a high level (hereinafter called "1") and turns off when the signal is at a low level (hereinafter called "0"). The control input terminal C of the switch SW1 is connected via an inverter 47 to the output terminal of a light control timer 13, which is composed of a one-shot circuit as will be described later herein. The switch SW1 turns off only when the light control timer 13 is in operation (produces the high level "1" only when the light control timer 13 is in operation).

An analog switch SW2 is arranged in the same manner as the switch SW1 and connects the capacitor 52 to the OP amp 2 via a mode selection switch SWD2, which will be described later herein. The control input terminal C of the switch SW2 is connected to the output terminal of an AND gate 43. One of the input terminals of the AND gate 43 is connected via an inverter 47 to the output terminal of the above light control timer 13. The other input terminal of the AND gate 43 is connected to the output terminal of an OR gate 42. One of the input terminals of the OR gate 42 is connected via an inverter 36 to the output terminal of a preliminary distance measuring timer 14 which is composed of a one-shot circuit. The OR gate 42 thus produces the high level "1" only when the preliminary distance measuring timer 14 is in operation. The other input terminal of the OR gate 42 is connected to the output terminal Q of a flip-flop 8 (hereinafter a flip-flop will be FF for short). The AND gate 43 thus it produces the high level "1" only when both the light control timer 13 and the preliminary distance measuring timer 14 are inoperative and when the output terminal Q of the FF 8 produces the high level "1" with the light control timer 13 inoperative. Such being the arrangement of the AND gate 43, the switch SW2 turns on only under the above condition.

A switch SW3 is arranged in the same manner as the above switch SW1 and connects the capacitor 50 to the OP amp 2. The control input terminal C of the switch SW3 is connected via an inverter 36 to the output terminal of the preliminary distance measuring timer 14. Therefore, the switch SW3 turns off only when the preliminary distance measuring timer 14 is in operation.

Another switch SW4 is arranged in the same manner as the above switch SW1 and connects to the OP amp 2 the capacitors 49 and 48 in parallel connected via a switch SWD4, which is interlocked with the above-stated switch SWD2. The control input terminal C of the switch SW4 is connected to the output terminal of an AND gate 45. The AND gate 45 has one of its input terminals connected via the inverter 36 to the output terminal of the preliminary distance measuring timer 14 and the other input terminal is connected to the output terminal of an OR gate 44. The OR gate 44 has one of its input terminals connected via an inverter 47 to the output terminal of the above light control timer 13 and the other input terminal is connected to the output terminal of an OR gate 40.

With such an arrangement, the AND gate 45 produces the high level "1" only when both the light control timer 13 and the preliminary distance measuring timer are inoperative and when the output level of the OR gate 40 is high level "1" with the preliminary distance measuring timer 14 inoperative. The switch SW4 turns on only under that condition.

A switch SWG is arranged in the same manner as the above switch SW1 and serves as a count switch for short-circuiting the above capacitors 48–50, 52 and 53. The control input terminal C of the switch SWG is connected to the output terminal of a NOR gate 46. The input terminals of the NOR gate 46 are connected to the output terminals of the above light control timer 13 and the preliminary distance measuring timer 14. The switch SWG only turns on when both the light control timer 13 and the preliminary distance measuring timer 14 are inoperative.

The operation of each of the switches described above is summarized in the following table:

TABLE 1

| | |
|---|---|
| SW1 - on (a): | When the light control timer 13 is not operating. |
| off (b): | When the light control timer 13 is in operation. |
| SW2 - on (c): | When both the light control timer 13 and the preliminary distance measuring timer 13 are inoperative. Also, when the flip-flop FF 8 produces a high level "1" output with the light control timer 13 inoperative. |
| off (d): | When the flip-flop light control timer 13 is inoperative. Also when the FF 8 is producing a low level "0" output with the preliminary distance measuring timer 14 in operation. |
| SW3 - on (e): | When the preliminary distance measuring timer 14 is not operating. |
| off (f): | When the preliminary distance measuring timer 14 is in operation. |
| SW4 - on (g): | When both the preliminary distance measuring timer 14 and the light control timer 13 are inoperative. Also, when the output level of the OR gate 40 is at the high level "1" with the preliminary distance measuring timer 14 inoperative. |
| off (h): | When the preliminary distance measuring timer 14 is in operation. When the output level of the OR gate 40 is at the low level "0" with the light control timer 13 in operation. |
| SWG - on (i): | When both the light control timer 13 and the preliminary distance measuring timer 14 are inoperative. |
| off (j): | When all conditions except when both the light control timer 13 and the preliminary distance measuring timer 14 are inoperative. |

An A-D converter circuit 3, which is a known parallel type A-D converter circuit, consists of a plurality of comparators and analog-to-digital converts the output of the OP amp 2. The levels of all the outputs D1–D5 of the converter circuit 3 become low level "0" when the output level of the OP amp 2 is lower than a first value Level 1. The level of the output D1 becomes "1" when the output level of the OP amp 2 is between the first value and a second value Level 2. Further details of the outputs of the converter circuit 3 in relation to the output level of the OP amp 2 are as shown in FIG. 3(a). Referring to FIG. 3(a), the level values Level 1–Level 5 are set in a multiple series with doubling increments. The set input terminal S of the flip-flop FF 8 is connected to the output terminal D5 of the A-D converter circuit 3. When the output level of the OP amp 2 exceeds the fifth level value Level 5, the FF flip-flop 8 is set and produces the high output level "1" from the output terminal Q thereof.

When the preliminary distance measuring timer 14 inverts the high output "1" thereof into a low output level "0" (after the lapse of a preliminary distance measuring time), a latch circuit 4 latches the output of the A-D converter circuit 3 in response to a signal rise which reaches the clock terminal CP thereof via the inverter 36. A decoder 5 produces the high output level "1" from one of output terminals thereof in response to the output of he latch circuit 4 and the output Q of the flip-flop FF 8 as shown in FIG. 3(b). Referring to FIG. 3(b), an aperture value (or designated aperture value) for flash photography is selected in accordance with the output of the decoder 5.

As apparent from Table 1 above, each of the switches SW1-SW4 and SWG is in the initial stage of operation. Each of the capacitors 48–50, 52 and 53 is short-circuited. After that, when the preliminary distance measuring timer 14 becomes operative with a preliminary distance measuring action, the switches SW2-SW4 and SWG turn off while the switch SW1 is on. Therefore, the integrating action of the OP amp 2 on the reflected light quantity from the object is carried out with the capacitor 53 during preliminary distance measurement. In this instance, as mentioned in the foregoing, the integration output is converted into a digital value as shown in FIG. 3(a). Therefore, when the output level of the OP amp 2 during the preliminary distance measurement does not exceed the value Level 5, an applicable one of the output terminals Q0–Q4 produces the high output level "1" designating one of the designatable aperture values F 1–F 4 as shown in FIG. 3(b). Furthermore, when the output level of the OP amp 2 becomes higher than value Level 5 during the preliminary distance measurement, the flip-flop FF 8 is set. Therefore, with the integration output becoming higher than the value Level 5 during the integrating action for preliminary distance measurement, the switch SW2 turns on satisfying the condition (c) of Table 1. Then, the OP amp 2 has the capacitors 53 and 52 connected in parallel as integrating capacitors. Since the capacitors 53 and 52 are in the capacity ratio of 1:31 the output level of the OP amp 2 drops to a level lower than the value Level 1 as shown in FIG. 2(c) when the output level of the OP amp 2 reaches the value Level 5. Then, the integrating action is carried out with the capacitors 53 and 52 connected in parallel for a period of time defined by the preliminary distance measuring timer 14. In other words, when the output level of the OP amp 2 exceeds the value Level 5 during preliminary distance measuring, the capacity of the integrating capacitor of the OP amp 2 is shifted and the output level of the OP amp 2 again changes to a level lower than the value Level 1. The integrating action is resumed from that shifted condition. Then, as shown in FIG. 3(b), the decoder 4 produces the high output level "1" from one of the output terminals Q5–Q10, depending on the A-D converted value of the output of the OP amp 2 obtained after the switch-over of the integrating capacity. Then, the high output level "1" thus produced designates one of the applicable aperture values between F 5.6 and F 32.

Since the output values Level 1–Level 5 are set in a multiple series as mentioned in the foregoing, the relation of the output value of the OP amp 2 obtained at the end of preliminary distance measurement (or the level of light quantity received as a result of preliminary distance measurement) to these values is as shown in FIG. 3(c). Assuming that the output of the OP amp 2 reaches the Level 1 when it is at a value V1 (the received light quantity level at that time is assumed to be E1), the Level 2 is attained when the output of the OP amp 2 is 2V1 (2E1); the Level 3 is attained when the output of the OP amp 2 is 4V1 (4E1); and the Level 4 is attained when the output of the OP amp 2 is 8V1 (8E1). As is apparent from FIGS. 3(a) and 3(b), the output of the decoder 5 varies depending on the output variation in the multiple series of the OP amp 2. The aperture value changes by one step every time the preliminary distance measurement output (i.e. received light quantity) changes two-fold.

Furthermore, when the output of the OP amp 2 reaches 16V1 (16E1) during the process of the preliminary distance measurement, that is, when it exceeds the Level 5, the switch SW2 turns on and the capacity of the integrating capacitor increases 32 times. Therefore, the output of the OP amp 2 changes to a value 1/32 times as much as its value when the received light quantity reaches 16E1, which is two as much as the above value 8E1. The output of the OP amp 2 is 16V1 when the received light quantity reaches 16E1. Therefore, as mentioned above, the value 16V1 is multiplied by 1/32 and the output of the OP amp 2 is shifted to $16V1/32 = \frac{1}{2}V1$. Accordingly, when the output reaches the Level 5, the value of the output of the OP amp 2 becomes lower than V1, i.e lower than the Level 1. As a result, the output levels of the output terminals D1–D5 of the A-D converter circuit become low level "0". The low output level "0" of the A-D converter circuit and the high output level "1" of the output terminal Q of the flip-flop FF 8 jointly cause the decoder 5 to produce the high output level "1" from its output terminal Q5 designating an aperture value F 5.6 as shown in FIG. 3(b). In this manner, the capacity of the capacitor is shifted when the output exceeds the Level 5 and thus the output of the OP amp 2 is changed to $\frac{1}{2}V1$ when the received light quantity is 16E1. Then, the output of the OP amp 2 is changed in a multiple series every time the received light quantity level changes two-fold. Accordingly, as shown in FIG. 3(c), the output of the OP amp 2 becomes V1 (Level 1) when the received light quantity is 32E1 and becomes 2V1 (Level 2) when the received light quantity is 62E1. Therefore, even after the output of the OP amp 2 exceeds the Level 5 during preliminary distance measurement, the A-D converter circuit is capable of varying its output every time the received light quantity changes two-fold, as shown in FIG. 3(c). The decoder 5 also varies its output every time the A-D conversion output varies, that is, every time the received light quantity changes two-fold, as shown in FIG. 3(b). The aperture thus can be designated by shifting it by one step based on the result of preliminary distance measuring every time the multiple series of the received light quantity levels changes as a result of preliminary distance measurement.

A multiplexer 6 selectively produces the output of the above decoder 5 or that of a ring counter 10. The multiplexer 6 only produces the output when the high level signal "1" is impressed on an inhibit terminal "b" thereof; selects the contents of the ring counter 10 when the high level signal "1" is impressed on a control terminal "a" thereof; and selects and produces the output of the decoder 5 when the low level signal "0" is impressed on the terminal "a". A D-A converter circuit 7 converts a digital signal from the above multiplexer 6 into a voltage (analog). The circuit 7 produces a voltage corresponding to F 32 when the high level signal "1" is impressed on an input terminal Q10 thereof and a voltage corresponding to F 22 when the high level signal "1" is impressed on an input terminal Q9. Other voltages corresponding to different steps of aperture values F 16–F 1 are likewise produced when the high level signals "1" are impressed on other input terminals Q8–Q0. A terminal Av transmits the output of the D-A converter circuit 7 to an aperture control device of the camera, which is not shown, for setting the aperture of the camera at the above designated aperture value.

A display circuit 11 drives a digital display device 12 which is a 7-segment or dot display device or the like, based on the output of the above multiplexer 6. The embodiment includes a main capacitor 27 which emits a main flash; bleeders 28 and 29 which divide the charge voltage of the main capacitor 27; and a comparator 16 which has the above bleeders 28 and 29 connected to one of its input terminals and a reference level Vref impressed on the other input terminal. The comparator 16 thus produces the high output level "1", as a charge completion signal when the charge level of the main flashing capacitor 27 reaches a predetermined level.

A light emitting diode 17 makes a charge completion display in response to the above charge completion signal. A transistor 22 becomes operative in response to the charge completion signal. The collector of the transistor 22 is connected via a resistor 21 to a terminal Tv. The terminal Tv is connected to a terminal of the camera which is not shown. A constant voltage is impressed on this terminal Tv by the first operating stroke on the camera. This turns on the transistor 22. Then, a constant current flows via the terminal Tv shifting the operation mode of the camera (control over the shutter and the aperture) from a daylight mode to a flash mode. A comparator 15 compares the constant voltage impressed on the above terminal Tv with the reference level Vref and produces the high output level "1" when the constant voltage is impressed by the firt stroke. An AND gate 19 produces the high output level "1" in response to the above charge completion signal and the high output level "1" of the comparator 15. In such an arrangement, with the charging process completed and with the first stroke, the AND gate 19 produces the high output level "1" as a preliminary distance measurement start signal. The preliminary distance measuring timer 14 produces the high level signal "1" for a predetermined period of time in response to the preliminary distance measurement start signal. An auxiliary flash discharge tube 25 serves as a light source for preliminary distance measurement. A trigger circuit 24, which is responsive to the high level signal "1" of the preliminary distance measuring timer 14, triggers the flash discharge tube 25 discharging the electric charge of the capacitor 26 for preliminary distance measurement.

An X contact X is connected with a synchronizing switch of the camera. The contact X receives a synchro-switch-on signal when the synchronizing switch is operated. This signal is transmitted via an inverter 23 to the light control timer 13 causing the light control timer 13 to produce the high level signal "1" for a predetermined time period. A trigger circuit 32 operates in response to the high level signal "1" of the light control timer 13, triggering a main flashing discharge tube 33. The discharge tube 33 then discharges the electric charge of the main capacitor 26 to perform flashing. A flash stop circuit 34 consists of a commutation capacitor, etc. and stops the discharging action of the flash discharge tube 33 in response to high output level "1" produced from an AND gate 35 as a flash stop signal.

In this specific embodiment, as has been described above, the OP amp 2 and the capacitors 50, 49 and 48 form a Miller integrator for light control. The A-D converter circuit 3 detects the output of the OP amp 2 even during a light control action. When the output level of the OP amp 2 reaches a predetermined value, the AND gate 35 produces the high output level "1" stopping the flash emission. The AND gates A1-A5 and OR gates 01-05 form a light control condition setting circuit, which sets the level of the received light quantity to be obtained by the Miller integrator at a value corresponding to the selected designatable aperture value mentioned in the foregoing. The light flash quantity is adjusted by these circuits to a value corresponding to the photo-taking aperture. The input terminals of the OR gate O1 are connected to the output terminals Q0, Q1 and Q6 of the decoder 5. As is apparent from FIG. 3(b), the OR gate 01 produces the high output level "1" to select the AND gate A1 when the photo-taking aperture is large and of an F-number less than F 1.4 and when the aperture is F 8. Meanwhile, the other input terminal of the AND gate A1 is connected to the output terminal D1 of the A-D converter circuit 3. Therefore, when the output (received light quantity level) of OP amp 2 reaches the above value Level 1 when the photo-taking aperture is F 1.4 or F 8, the AND gate A1 produces the high output level "1". This high output level "1" is then transferred via the OR gate 41 to the AND gate 35 producing the flash stop signal and stopping the flashing action.

During the light control operation, the relation of the photo-taking aperture (or designated aperture) to the selection of OR and AND gates and the output of the OP amp (received light quantity level) when flashing is stopped, as shown in FIG. 3(d).

The OR gate 40 is connected via the multiplexer 6 to the output terminals Q6-Q10 of the decoder 5. Therefore, when the aperture is smaller than an aperture of F 8 (see FIG. 3(b)), the OR gate 40 produces the high level "1".

When the aperture is less than F 1.4, the flashing action is stopped when the output of the OP amp 2 reaches the Level 1 as mentioned above. When the aperture is F 2, the AND gate A2 is selected and the gate A2 produces the high level "1" in response to the high output level "1" of the output terminal D2 of the A-D converter when the output of the OP amp 2 reaches the Level 2. The high output level "1" of the AND gate A2 causes the AND gate 35 to produce the high level "1" which stops the flashing. At an aperture value of F 2.8, the AND gate A3 is selected. The gate A3 produces the high level "1" in response to the high level "1" produced from the output termnal D3 of the A-D converter when the output of the OP amp 2 reaches the Level 3 and thus the flashing stops. At another aperture value of F 4, the flashing action likewise stops when the output of the OP amp 2 reaches the Level 4. The flashing action stops when the output of the OP amp 2 reaches the Level 5 at an aperture value of F 5.6.

Let us now assume, in the same manner as in the foregoing, that the output of the OP amp 2 is V1 when it reaches the Level 1 and that the received light quantity level at that instant is E1. The level values Level 1-Level 5 are set in a multiple series as mentioned in the foregoing. Therefore, as shown in FIG. 3(d), at an aperture of an F-number less than F 1.4, flashing stops when the output of the OP amp 2 becomes V1, i.e. when the received light quantity becomes E1. At F 2, flashing stops when the output of the OP amp 2 becomes 4V1 and the received light quantity 4E1 the Level 3. At F 4 and F 5.6, flashing likewise stops when the received light quantity becomes 8E1 and 16E1 reaches the Level 4 and Level 5 respectively. Thus, with the aperture opened greater than F 5.6, the received light quantity varies two-fold for an aperture change of one step. Therefore, the quantity of light flashed is accurately adjusted according to the designated aperture value in the same manner as in an ordinary automatic flash device.

Furthermore, with the aperture opening less than F 8, one of the applicable output terminals Q6-Q10 of the decoder produces the high output level "1" causing the OR gate 40 to produce the high output level "1". Then, since the condition (g) of Table 1 is satisfied, the switch SW4 turns on. With the switch SW4 turned on, the capacitors 49 and 48, which are connected in parallel with the capacitor 50, are added as the light controlling capacitors 49, 48. As mentioned in the foregoing, the capacity of the capacitor 50 and that of the capacitors 48 and 49 as a unit connected in parallel are set in the ratio of 1:31, the capacity of the integrating capacitor for light control is increased by 32 times as much as the integrating capacity used for aperture values F 1-F 5.6. Therefore, in the event that the aperture value is at F 8, the output of the OP amp 2 reaches V1 to become the Level 1 when the received light quantity becomes 32E1, which is 32 times as much as the value E1. Furthermore, at F 8, the AND gate A1 is selected as shown in FIG. 3(d). Therefore, the AND gate A1 produces the high output level "1" stopping flashing when the output of the OP amp 2 reaches Level 1. As a result, with the aperture at F 8, flashing stops when the received light quantity level reaches 32E1, which is twice as much as the received light quantity 16E1 for F 5.6. At F 11, the AND gate A2 is selected. Therefore, in this instance, flashing stops when the output of the OP amp 2 becomes 2V1, i.e. Level 2 which is twice as much as Level 1. The output of the OP amp 2 becomes V1 to reach Level 1 when the received light quantity level is 32E1. At F 11, therefore, flashing stops when the received light quantity level reaches 64E1, which is twice as much as the received light quantity required for the aperture value of F 8. Thus, even when the aperture is smaller than F 8, the received light quantity at flashiing termination varies in a multiple series for the stepwise variation of the aperture, as shown in FIG. 3(d). Therefore, the light flash quantity can be appositely controlled depending on the setting value of the aperture over the whole range of aperture values to be used in the same manner as in the light control operation of the ordinary automatic flash device. A reference symbol SWMD denotes a mode selection switch. A first mode (a total automatic mode) has the switch SWMD connected to one side "a" thereof and a second mode (a manual magic mode) has the switch connected to the other side "b". The circuit arrangement further includes an inverter 38-1; AND gates 38-2 and 38-3; and an OR gate 38-4. These gates form control logic for operating the multiplexer 6 in the mode selected by the above selection switch SWMD. A magnitude comparator 9 compares the output of the decoder 5 with the output of the ring counter 10. The comparator 9 produces the high output level "1" when the decoder output>the counter output. The ring counter 10 shifts its output by one step (Q0'→Q10'→Q0') every time a switch SW11 turns on and produces the high output level "1" from the applicable output terminal. Furthermore, the ring counter 10 may continuously effect the above shift when the switch SW11 is on longer than a predetermined time period. Switches SWD2 and SWD4 are interlocked. When a daylight synchronizing mode is selected in response to an operation on daylight synchronizing mode selecting means (not shown), the switch SWD4 turns off and the switch SWD2 is connected to the resistor 54 in place of the capacitor 52. A switch SW12 turns on when the switch SWMD is connected to the side "a". With the switch SW12 turned on, a charging process completion level is lowered in the above first mode for quicker photographing.

A camera usable in combination with the embodiment shown in FIG. 1 may be selected from the cameras with well known functions and arrangements, such as the one disclosed in Japanese Patent Application Laid-Open No. SHO 52-50722. Since the details of such a camera are well known and since it is not directly related to the present invention, description of the camera is omitted herein.

In the following description of the operation of the embodiment shown in FIG. 1, the operation thereof in the first mode (automatic mode) is first described:

In the first mode, the switch SWMD is connected to the side "a" thereof with the flash device mounted on the camera. Under this condition, both the AND gates 38-2 and 38-3 produce the low output level "0". Therefore, the low input level "0" is impressed on the control terminal "a" of the multiplexer 6. The multiplexer 6 thus supplies the output of the decoder 5. When the power source (not shown) of the flash device is turned on under this condition, the main capacitors 27 and 26 are charged in a known manner. The charged condition of the main capacitor 27, which is provided for main flashing, is detected by the comparator 16. Since the switch SW12 is on, the charging completion level is lower in the first mode than in other modes. Upon change completion of the main capacitor 27, the comparator 16 sends out a charge completing signaling charging completion by lighting up the light emitting diode 17. Then, when the first stroke of operation is performed on the camera (not shown), a constant voltage is impressed from the camera on the terminal Tv. Since the charge completion signal is impressed on the base of the transistor 22 at that instant, the transistor 22 turns on allowing a predetermined current flow from the terminal Tv. As a result, the camera is shifted from a daylight mode to a flash photography mode and is thus set controlling the aperture in response to an aperture signal from the terminal Av. Furthermore, the constant voltage from the terminal Tv causes the comparator 15 to produce the high output level "1". The AND gate 19 produces the high output level "1" in response to the high output level "1" of the comparator 15 and the charge completion signal. The high output level "1" of the AND gate 19 actuates the preliminary distance measuring timer 14 for preliminary distance measurement. The preliminary distance measuring timer 14 produces the high output level "1" for a predetermined period of time. The high output level "1" of the preliminary distance measuring timer 14 actuates the trigger circuit 24. The auxiliary flash discharge tube 25 then discharges the electric charge of the preliminary distance measuring main capacitor 26 in synchronization with the start of the preliminary distance measuring timer 14 (the point of time t1 shown in FIG. 2). Pre-flashing begins as sown in FIG. 2(a).

Meanwhile, as is apparent from Table 1, all the switches SW1–SW4 and SW5 are on in the initial stage of operation. Furthermore, a change in the output of the preliminary distance measuring timer 14 from the low level "0" to the high level "1" at the start of the preliminary distance measuring timer 14 actuates the one-shot circuit 37 resetting the FF 8 and to making the output Q level of the FF 8 low level "0". With the preliminary distance measuring timer 14 beginning to operate, each of the conditions (a), (d), (f), (h) and (j) of Table 1 is satisfied. Accordingly, the switches SW2–SW4 and SWG turn off and the switch SW1 turns on. An integrating action on reflected light quantity coming from the object as a result of the above pre-flashing begins using the capacitor 53. Light quantity integrating action with the capacitor 53 is carried on until the switch SWG turns on. Since the switch SWG turns on when the distance measuring timer 14 becomes inoperative as shown at (i) in Table 1, this integrating action is carried on during the predetermined operating time period of the preliminary distance measuring timer 14.

The integrating quantity (or received light quantity) of the above capacitor 53 is determined by the reflected light quantity coming from the object to the light sensitive element 1 as a result of pre-flashing during the operating time of the preliminary distance measuring timer 14. Therefore, the integrating quantity (received light quantity) becomes smaller as the object distance increases. In the event that the object is located at a distance greater than a predetermined distance, the integration output which is produced from the OP amp 2 becomes lower than the level value Level 5. Then, based on of the output of the OP amp 2, the output of the A-D converter circuit indicates one applicable value within the range I of FIG. 3(c), depending on the object distance represented by the received light quantity level resulting from preliminary distance measuring. This output of the A-D converter circuit is then latched by the latchiing circuit 4 in synchronization with a rising signal produced from the inverter 36 at the inversion time of the output of the preliminary distance measuring timer 14 (upon time operation completion).

The output of the latching circuit 4 is transferred to the decoder 5. As mentioned in the foregoing, if the output of the OP amp 2 does not exceed Level 5 during the process of preliminary distance measurement, the FF 8 is not set and is producing the low output level "0" from its output terminal Q. Therefore, the decoder 5 produces the high output level "1" from the applicable output terminal selected from one of the output terminals Q0–Q4, depending on the A-D conversion output, as shown in FIG. 3(b). Furthermore, at that time, the multiplexer 6 is selecting the output of the decoder 5 while the above high output level "1" of the AND gate 19 is supplied via the OR gate 39 to the inhibit input terminal "b" of the multiplexer 6. Therefore, the output of the decoder 5 is sent out via the multiplexer 6 and is supplied to the D-A converter circuit 7. Since the outputs Q0–Q4 of the decoder 5 represent aperture values F 1–F 4, the D-A converter circuit 7 produces a voltage corresponding to one of the applicable aperture values F 1–F 4 depending on the received light quantity resulting from the preliminary distance measurement, i.e. according to the object distance, based on the above output of the decoder 5. The voltage thus produced from the D-A converter circuit 7 is supplied via the terminal Av to the aperture control device of the camera. When the object is located close-up, the integration output of the OP amp 2 (received light quantity) exceeds the above value Level 5 during the distance measuring process. In that situation, therefore, the A-D converter circuit 3 produces the high output level "1" from the output terminal D5 during the distance measuring process as shown in FIG. 3(a) and the FF 8 sets the level of the output Q of the FF 8 at the high light "1", as shown at (d) in FIG. 2. Therefore, with the output of the OP amp 2 exceeding Level 5 during the distance measuring process, the switch SW2 turns on at the time (t2 of FIG. 2) when the high output level "1" is produced from the A-D converter circuit 3. With the switch SW2 thus turned on, the capacity of the integrating capacitor is increased permitting the ensuing integrating action to be carried on during the operating time of the preliminary distance measuring timer 14. In this situation, therefore, the output of the A-D converter circuit 3 shows one of the values within the range II of FIG. 3(c) based on the received light quantity level resulting from the preliminary distance measurement, i.e. the distance to the object. This A-D conversion output is then latched by the latching circuit 4 in a manner mentioned in the foregoing. Since the level of the output Q of the FF 8 becomes high level "1" in this situation, the decoder 5 produces the high output level "1" from the applicable ouput terminal selected from the output terminals Q5–Q10, based on the A-D conversion output as shown in FIG. 3(b). This output is then supplied to the D-A converter circuit 7 via the multiplexer 6. The outputs Q5–Q10 of the decoder 5 represent aperture values F 5.6–F 32 respectively. Therefore, the D-A converter circuit 7 produces, based on the above output of the decoder 5, a voltage corresponding to an applicable voltage value selected from one of the aperture values F 5.6–F 32 that is suited for the received light quantity level resulting from preliminary distance measurement, i.e. the object distance. The voltage thus produced is supplied via the terminal Av to the aperture control device of the camera.

With the preliminary distance measuring action carried out in the manner described above, the aperture values from F 1 to F 32 are determined stepwise depending on the object distance. With the aperture value thus determined, when a second stroke is performed on the camera, the aperture control device of the camera adjusts the aperture on the basis of the voltage from the terminal Av to the flash photography aperture value determined through preliminary distance measurement.

When exposure begins with the leading shutter curtain of the camera beginning to travel, a synchronizing switch, which is interlocked with the leading shutter curtain, turns on. A synchro-switch-on signal is then transferred to the light control timer 13 via the contact X and the inverter 23. The light control timer 13 then shifts its output level from the low level "0" to the high level "1". Shifting of the light control timer 13 output level to the high level "1" actuates the trigger circuit 32 triggering the main flashing discharge tube 33. The discharge tube 33 discharges the electric charge of the main capacitor 27 which begins to emit a photo-taking flash of light at the time (t4 of FIG. 2) when the timer 13 begins to operate as shown at (a) in FIG. 2. Since the conditions (a), (c), (e), (g) and (i) of Table 1 are satisfied during a period from the time (t3 of FIG. 2) when the preliminary distance measuring timer 14 becomes inoperative with the above preliminary distance measuring action completed to another time (t4 of FIG. 2) when the light control timer 13 begins to operate, all the switches SW1-SW4 and SWG are on. Therefore, all the capacitors 48–50, 52 and 53 are in a reset condition. When the light control timer 13 operates at the time (t4 of FIG. 2) performing a light quantity integrating action for light control, the light control capacitor begins an integrating action from the initial stage thereof.

Let us now assume that an aperture value designated through the above preliminary distance measuring action is for an aperture larger than F 5.6. In this instance, one of the output terminals Q5–Q0 of the decoder 5 produces the high output level "1" while all the outputs Q6–Q10 produce the low level outputs "0". Accordingly, the OR gate 40 also produces the low output level "0". Therefore, when the light control timer 13 begins to operate, the conditions (b), (d), (e), (h) and (j) of Table 1 are satisfied. The switches SW1, SW2, SW4 and SWG turn off while the switch SW3 alone turns on. The integrating action by the light sensitive element 1 and the OP amp 2 on the reflected light quantity coming from the object as a result of the main flashing action is therefore carried out with the capacitor 50.

If the above-stated designated aperture value is F 1 or F 1.4, the decoder 5 produces the high output level "1" from the output terminal Q0 or Q1. Then, the AND gate A1 is selected as shown in FIG. 3(d). When the output of the OP amp 2 reaches the value Level 1 through the above integrating action, the AND gate A1 produces the high output level "1" in response to the high output level "1" of the output terminal D1 of the A-D converter circuit 3. The high output level "1" of the AND gate A1 is supplied via the OR gate 41 to the and gate 35. The AND gate 35 then produces the high output level "1" as a flash stop signal, which is transmitted to the flash stop circuit 34 stopping the flashing. If the designated aperture value is F 2, the AND gate A2 is selected, as will be apparent from FIG. 3(d). In that situation, the output of the OP amp 2 reaches Level 2 when the received light quantity obtained by the above integrating action reaches a value twice that of the value required for F 1 and F 1.4. The AND gate A2 then produces the high output level "1" bringing flashing to a stop. In this manner, the received light quantity level obtained at the end of flashing varies in a multiple series for the stepwise variation of the designated aperture value as shown in FIG. 3(d) and the flash light quantity to be emitted is determined according to the aperture value.

If the designated aperture value is between F 8 and F 32, one of the output terminals Q6–Q10 of the decoder 5 produces the high output level "1". The OR gate 40 then produces the high output level "1". Therefore, at the beginning of the light control action, the conditions (b), (d), (e), (g) and (j) of Table 1 are satisfied and the switches SW1, SW2 and SWG turn off while the switches SW3 and SW4 turn on. As a result, the capacitors 48–50 are selected as integrating capacitors for the light control action. The capacity of the integrating capacitor 48, 49, 50 thus becomes 32 times as much as the capacity required for an aperture value between F 1 and F 5.6. Therefore, even in the case of smaller apertures than F 8, the received light quantity obtained by the above integrating action at the flashing termination time varies exactly in a multiple series for stepwise variation of the aperture, as shown in FIG. 3(d) and as mentioned in the foregoing.

With the received light quantity accurately varied in a multiple series depending on the stepwise variations of the photo-taking aperture as mentioned above, the light control action accurately adjusts the flash light quantity before flashing stops. Meanwhile, since the operation mode of the camera has been shifted to the flash photography mode, the shutter time of the camera is adjusted to a flash synchronizing shutter time value such as 1/60 sec., for example.

In the first mode, the aperture value is determined based on the object distance by pre-flashing. The light control level is set based on the aperture value. This arrangement ensures an apposite exposure. Since the pre-flashing light quantity is employed as a factor in determining the aperture value, even if the charge completion level is lowered, the aperture value is determined based on the charge potential GNO of the main capacitor obtained at that instant. Therefore, unlike the conventional automatic flash device, flash photography can be performed without waiting until the main capacitor is charged to a considerably high level. This arrangement thus permits faster photography.

In this embodiment, as mentioned in the foregoing and as shown in FIG. 3(c), the aperture value varies by one step every time the received light quantity level varies in a multiple series during preliminary distance measurement. Meanwhile, the received light quantity obtained during preliminary distance measurement is determined by the object distance and the received light quantity doubles every time the object distance changes by $1/\sqrt{2}$ during the same process of preliminary distance measurement. In this embodiment, therefore, the aperture value varies by one step every time the object distance varies by $\sqrt{2}$ times as shown in FIG. 4, wherein the axis of ordinate shows the logarithmic scale of the aperture value and the axis of abscissa of the object distance. However, in situations where broadening the range of the object distances for a specific aperture value is desired, such as F 5.6, which is normally used for flash photography, the capacity of the capacitor 52 may be set at a value at least 31 times that of the capacitor 53 as shown by a broken line in FIG. 4. Such an arrangement enables the distance range to be increased a desired extent for the aperture value to be used for normal flash photography.

For example, with the capacity of the above capacitor 52 being 63 times that of the capacitor 53, the relation of the output of the OP amp 2 to the received light quantity obtained during preliminary distance measurement is unvarying from FIG. 3(c) within the range from Level 1 to Level 4. However, the capacity of the integrating capacitor 52 increases by 64 times when the output of the OP amp 2 exceeds the Level 5 and, as a result, the integrating capacitor 52 is connected to the OP amp 2. Then, the output of the OP amp 2 is multiplied by 1/64. As mentioned in the foregoing, the output of the OP amp 2 is 16 V1 when it reaches Level 5, as shown in FIG. 3(c). Therefore, with this value 16 V1 multiplied by 1/64, the output of the Op amp is thus shifted to a value of ¼ V1 when it reaches Level 5. Furthermore, when the output of the Op amp 2 reaches Level 5 becoming the value 16 V1, the received light quantity level is 16E1 which is twice the value of Level 4. Therefore, at Level 5, the aperture value also varies by one step for the two-fold change of the received light quantity in the same manner as mentioned in the foregoing. After that, however, the voltage ratio before the OP amp 2 output reaches V1 becomes ¼ V1:V1 which is a four-fold voltage ratio. Accordingly, after the output of the Op amp 2 reaches Level 5, i.e. 16 V1 (¼ V1), the received light quantity level also increases four-fold and becomes 64E1 until the output of the Op amp 2 reaches Level 1 (V1). Thus, the received light quantity level, Level 5, required before the aperture value changes by one step after the output of the OP amp 2 has reached level 5 is increased four times. Furthermore, then, the output of the Op amp 2 reaches Level 2 or Level 3 every time it varies by two times, thus becoming 2 V1 or 4 V1. Therefore, the aperture value also varies by one step every time the output of the Op amp 2 varies by two times. The aperture value thus varies by one step every time the received light quantity level varies by two times.

Therefore, with the capacity of the capacitor 52 63 times as much as that of the capacitor 53, the relation of the received light quantity to the aperture value becomes as shown in Table 2 below:

TABLE 2

| Output of OP amp | Received light quantity level | Aperture value |
|---|---|---|
| Less than V1 | Less than E1 | F 1 |
| V1 | E1 | F 1.4 |
| 2V1 | 2E1 | F 2 |
| 4V1 | 4E1 | F 2.8 |
| 8V1 | 8E1 | F 4 |
| 16V1 = ¼V1 | 16E1 | F 5.6 |
| V1 | 64E1 | F 8 |
| 2V1 | 128E1 | F 11 |
| 4V1 | E1 | F 16 |
| 8V1 | 512E1 | F 22 |
| 16V1 | 1024E1 | F 32 |

As is apparent from Table 2, the aperture value varies by one step for every two-fold change of the received light quantity within the range of aperture values from F 1 to F 5.6 and, therefore, it varies by one step every time the object distance varies by $\sqrt{2}$ times. However, at the time of a shift from F 5.6 to F 8, the received light quantity changes four times. As a result, the object distance at the time of the shift from F 5.6 to F 8 changes two-fold. Therefore, the aperture does not vary by one step until the object distance for F 5.6. Furthermore, in the range of aperture values from F 8 to F 32, the aperture value varies by one step for every two-fold change of received light quantity in the same manner as with the aperture values F 1–F 5.6. Within this range, therefore, the aperture value varies by one step for every change of the object distance $\sqrt{2}$ times. The arrangement described above thus makes the aperture value F 5.6 applicable to a wider range of object distances than other aperture values, as shown by a broken line in FIG. 4.

In the second mode (manual magic mode), the embodiment operates as follows: In this case, the switch SWMD is connected to the side "b" thereof. The OR gate 39 then produces the high output level "1" rendering the multiplexer 6 operative. Furthermore, since the AND gate 19 is producing the low output level "0" before a shutter release operation as mentioned in the foregoing, high signal "1" level is transferred via the inverter 38-1 to the AND gate 38-2. The output level of the AND gate 38-2 becomes high level "1". This high output level "1" is transmitted via the OR gate 38-4 to the control terminal "a" of the multiplexer 6. The multiplexer 6 then produces the content of the ring counter 10. The counter 10 produces the high output level "1" from the applicable output terminal thereof by shifting its position from one output terminal to another every time the switch SW11 is depressed. The relation of the output of this counter 10 to the aperture value is as shown in FIG. 3(e). The counter 10 thus permits the photographer to select a desired aperture value. The information on the aperture value thus set at the counter 10 is transmitted to and displayed by the display device 12 via the multiplexer 6 and the display circuit 11.

Then, when the first stroke is performed on the camera and when the charging process on the main capacitor 27 is completed, the switch SW12 which is interlocked with the switch SWMD, turns off. Therefore, in this situation, the charge completing level is set at a higher level than in the first mode. Then, in the same manner as in the first mode, the AND gate 19 produces the high output level "1" when the mode of the camera is shifted to the flash photography mode. The high output level "1" of the AND gate 19 renders the preliminary distance timer 14 operative and the preliminary distance measuring action is carried out in the same manner as described in the foregoing. As a result, a digital value corresponding to the object distance is latched at the latching circuit 4 as mentioned in the foregoing. Then, the output of the decoder 5 is determined based on the content of the latching circuit 4. The output of the decoder 5 represents the aperture value as shown in FIG. 3(b) and, since the output of the decoder 5 is determined based on the object distance, the aperture value designated by the output of the decoder based on the result of preliminary distance measurement is the optimum value that ensures an apposite exposure.

With the designated aperture value determined through preliminary distance measurement in this manner, the comparator 9 compares the output of the decoder 5 with the output of the counter 10. When the result of the comparison is Qn (output of the decoder)>Qn' (output of the counter), the comparator 9 produces the high output level "1". The relation of the aperture value to these outputs of the decoder 5 and the counter 10 is shown in FIGS. 3(b) and 3(e). Therefore, the comparator 9 produces the high output level "1" from its output terminal when an aperture value obtained as a result of the preliminary distance measurement is of a larger F-number, i.e. when it represents a smaller aperture than the manually set aperture value. Let us now assume that the aperture value obtained by preliminary distance measurement represents a smaller aperture than the manually set aperture value. Under that condition, since the comparator 9 produces the high output level "1", the AND gate 38-3 produces the high output level "1", which is impressed via the OR gate 38-4 on the control terminal "a" of the multiplexer 6. The multiplexer then selects the ring counter 10. Accordingly, the D-A converter circuit 7 produces a voltage corresponding to the aperture value set at the counter 10. Then, the second stroke on the camera performs aperture control based on the set aperture value in the same manner as in the first mode. A light control action is also performed based on the set aperture value in the same manner as in the case of the first mode described in the foregoing.

Furthermore, in the event that the designated aperture value obtained though preliminary distance measurement represents an aperture larger than the aperture represented by the manually set aperture value, the comparator 9 produces the low output level "0". The AND gate 38-3 then produces an output "0". Furthermore, since the AND gate 19 is producing the high output level "1" after the commencement of the preliminary distance measurement, the AND gate 38-2 also produces the low output level "0". Therefore, in this instance, the low input level "0" is impressed on the control terminal "a" of the mulitplexer 6. Accordingly, the multiplexer 6 in this instance produces the decoder 5 output in place of that of the counter. After that, when the second stroke is performed, aperture control is performed in accordance with the designated aperture value obtained through preliminary distance measurement and light control action is performed based on the designated aperture value in the same manner as in the first mode.

In the second mode (manual magic), as described above, flash photography is carried out at an aperture value manually set, as desired, by the photographer when the manually set aperture value represents a larger aperture than the designated aperture value obtained by preliminary distance measurement. However, if the designated aperture is larger than the aperture of the manually set value and it is impossible to obtain an appropriate exposure at the latter value, flash photography can be carried out at the former value. Therefore, even in the event that some desired aperture value is manually set by the photographer without due consideration of exposure conditions, the embodiment always gives a correct exposure while preference is given to the aperture value manually set by the photographer in carrying out flash photography in the second mode.

The operation of the embodiment in the daylight synchronizing mode is as follows: Generally, daylight synchronized photography is performed under a bright photographic condition having a brightness level above a given value. The aperture is determined on the basis of the light of the object to be photographed (external light). The quantity of flash light for a principal object is set at a lower value than the quantity of flash light determined by a normal light control action which is performed based on a photo-taking aperture and the object distance. Photography operation is performed with an exposure approximately apposite the background and the principal object.

In view of the above general condition for daylight synchronized photography, the embodiment only performs daylight synchronized photography under a bright condition and determines the aperture and the quantity of flash of light in the manner as mentioned above. In the daylight synchronizing mode, the switch SWD2 is connected to the resisor 54 instead of the capacitor 52. The switch SWD4 is turned off. The seitch SWMD is connected to the side "a" thereof. With the switches SWD2, SWMD set in this manner, with the first stroke, after charge completion on the main capacitor, preliminary distance measuring is carried out in the same manner as in the first mode. Capacitor charging speed increases if the brightness of the object is higher than a predetermined value. Therefore, the output of the OP amp 2 exceeds Level 5 during preliminary distance measuring, as shown at (c) in FIG. 5. Then, as mentioned in the description of the first mode, the switch SW2 turns on. As a result, the resistor 54 is connected to the feedback line of the OP amp 2. The output of the OP amp 2 thereafter has a value corresponding to the brightness of light incident on the light sensitive element 1 instead of the light quantity value integrated by the capacitor 53. During the process of pre-flashing, the output of the OP amp 2 represents a value influenced by pre-flashing. However, after pre-flashing termination, the value corresponds to the brightness of the external light. Since pre-flashing ends in a shorter period of time than the time of the preliminary distance measuring 14 timer, the output of the OP amp 2 at the termination time of preliminary distance measurement (point of time t3 in FIG. 5) represents the brightness of the external light. Therefore, the digital value latched by the latching circuit 4 at the end of preliminary distance measurement, described in the foregoing with regard to the first mode, in this instance represents the brightness of the external light.

In this embodiment, as mentioned above, the OP amp 2 produces an output corresponding to the brightness of external light only when the brightness is high with a resistor connector to the OP amp 2. Therefore, the value latched by the latching circuit 4 in this instance represents an aperture not larger than F 8. In other words, with the external light brightness reduced to an aperture value, the above operation is carried out only when the brightness is at a value corresponding to a smaller aperture than F 5.6. The output of the OP amp 2 obtained at the end of distance measuring thus becomes as shown in FIG. 3(f) with F 8 being a basic value. Thus, according to the output of the OP amp 2 obtained at the end of the distance measuring action, the high output level "1" is produced by the applicable output terminal from one of the output terminals Q6-Q10 of the decoder 5 for aperture values F 8-F 32 and thus an aperture value is selected from the aperture values F 8-F 32, depending on the brightness. The output selecting action of the decoder 5 which is performed based on the output of the OP amp 2, is identical with that of the first mode and thus requires no further description.

With the aperture value determined based on brightness, when the second stroke is performed, the aperture is adjusted to the aperture value depending the brightness and the light control action is performed in the same manner as in the first mode. Since the aperture value used for daylight synchronizing is representative of an aperture not exceeding F 8 as mentioned above, it is one of the output terminals Q6-Q10 that produces the high output level "1". Therfore, the OR gate 40 produces the high output level "1". Then, for light control, the switch SW4 turns on in the same manner as in the first mode. As for the integrating capacitor normally used for light control, the capacitor 50 and the capacitors 48 and 49 are arranged in combination. One of the AND gates A1-A5 is selected and the quantity of flash light is appositely controlled based on the photo-taking aperture in the same manner as in the first mode. However, since the switch SWD4 is off as mentioned above, the integrating capacitor in this instance consists of the capacitors 50 and 48. As a result, the capacity of the integrating capacitor 50 and 48 used for light control in this instance is smaller than that of the integrating capacitor which consists of the capacitors 50, 48 and 49 and is used for light control in the first mode. Accordingly, the quantity of flash light in this situation is less than that of the first mode for the same object.

In the daylight synchronizing mode, as mentioned above, the aperture is controlled based on external light brightness and the flash light is used in a smaller quantity than in ordinary light control action. Therefore, flash photography can be carried out in the daylight synchronizing mode with an exposure which is approximately apposite to a background and a principal object.

In flash photography apparatus according to this invention, as described in detail in the foregoing, the output of the integration circuit obtained during preliminary distance measurement is converted into a digital value by the A-D converter circuit. When the output of the integration circuit reaches a predetermined value during the integrating operation, the input level to the A-D converter is lowered. Then, the integrating operation and the A-D converting operation on the integration output are performed again from that lowered input level. Therefore, even if the dynamic range of the A-D converter is low, the resolution of the apparatus can be increased permitting selection of aperture values of a wide range for the object distance.

In this specific embodiment, the input level is lowered by shifting the use of capacitors 50 and 48 of the integration circuit. However, this can be accomplished by shifting the density of the filter 56 instead of shifting the use of the capacitors 50 and 48; or may be accomplished by providing a stop in front of the light sensitive element 1 in place of the filter 56 and thus by shifting the aperture of the stop. It may also be accomplished by providing some voltage dividing means such as voltage dividing resistors or the like between the OP amp 2 and the A-D converter 3 to lower the input to the OP amp 2 instead of shifting the capacity of the integrating capacitor 50 and 48 by turning on the above switch SW2.

Furthermore, in this embodiment, operation of the integration circuit is controlled based on the input of the light sensitive element 1. However, this arrangement may be replaced with a different arrangement in which: A constant voltage is impressed beforehand on the integration circuit and the timer time defined by the preliminary distance measuring timer 14 is adjusted based on the quantity of received light.

Furthermore, the embodiment uses a parallel type A-D converter. However, in accordance with the invention, the A-D converter is not limited to the parallel type. A converter of a different type is, of course, usable, because in this invention, a comparator is used for detecting whether or not the integration output reaches a predetermined level during the process of preliminary distance measurement. When output reaches the level, the flip-flop 8 is set directly by the output of the comparator lowering the level of the integration output transmitted to the A-D converter. Then a digital value corresponding to an integration output produced at the end of preliminary distance measurement is obtained and the wide range of aperture values becomes designatable based on the result of detection (the set state of the FF 8) and the digital value obtained at the end of preliminary distance measurement. Furthermore, if the comparator detects the arrival or non-arrival of the OP amp 2 output at the above predetermined level, the A-D converter operates only upon completion of preliminary distance measurement.

What I claim:

1. A photographic apparatus usable in a flash photographic system of a kind which performs pre-flashing before flash photography, receives a reflection light from an object to be photographed as a result of pre-flashing and determines a flash photographic aperture value on the basis of the quantity of the reflection light received, comprising:
   (a) a light receiving circuit having a light sensitive element, said light receiving circuit forming a signal corresponding to the light quantity received by the light sensitive element;
   (b) a detection signal forming circuit arranged to detect the signal of the light receiving circuit and to produce a detection signal when the signal becomes a predetermined level;

(c) reducing means for lowering, in response to said detection signal, the signal of the light receiving circuit; and (d) an aperture determining circuit arranged to determine an aperture value on the basis of a presence of said detection signal and the signal level of the light receiving circuit.

2. A photographic apparatus usable in a flash photographic system of a kind which performs pre-flashing before flash photography, receives a reflection light from an object to be photographed as a result of pre-flashing and determines a flash photographic aperture value on the basis of the quantity of the reflection light received, comprising:

(a) a light sensitive element which receives said reflection light resulting from pre-flashing;

(b) an integration circuit connected to said light sensitive element and is arranged to integrate the output of said light sensitive element;

(c) a detection signal forming circuit arranged to detect the output of said integration circuit and to produce a detection signal when the output of said integration circuit reaches a predetermined value;

(d) reducing means for lowering the output of said integration circuit in response to said detection signal; and (e) an aperture determining signal forming circuit arranged to form a signal for determining an aperture value on the basis of the output of said integration circuit and a presence of said detection signal.

3. A photographic apparatus usable in a flash photographic system of a kind which performs pre-flashing before flash photography, receives a reflection light from an object to be photographed as a result of pre-flashing and determines a flash photographic aperture value on the basis of the quantity of the reflection light received, comprising:

(a) a light sensitive element which receives said reflection light resulting from pre-flashing;

(b) an integration circuit connected to said light sensitive element and is arranged to integrate the output of said light sensitive element;

(c) an A-D converter for converting the analog output of the integration circuit to a digital signal;

(d) a detection signal forming circuit arranged to produce a detection signal when the output of the A-D converter becomes a predetermined value;

(e) reducing means for lowering the output of said integration circuit in response to said detection signal; and (f) an aperture determining signal forming circuit arranged to form a signal for determining an aperture value on the basis of the A-D converted value from said A-D converter circuit and a presence of said detection signal.

4. A photographic apparatus usable in a flash photographic system of a kind which performs pre-flashing before flash photography, receives a reflection light from an object to be photographed as a result of pre-flashing and determines a flash photographic aperture value on the basis of the quantity of the reflection light received, comprising:

(a) a light sensitive element which receives said reflection light resulting from pre-flashing;

(b) an integration circuit connected to said light sensitive element and is arranged to integrate the output of said light sensitive element;

(c) an A-D converter circuit arranged to A-D convert the output of said integration circuit;

(d) a detection signal forming circuit arranged to detect an A-D converted value obtained from said A-D converter circuit and to produce a detection signal when said A-D converted value becomes a predetermined value;

(e) reducing means for lowering the output of said integration circuit in response to said detection signal; and (f) an aperture determining signal forming circuit arranged to form a signal for determining an aperture value on the basis of the A-D converted value from said A-D converter circuit and an existence of said detection signal.

5. A flash device comprising:

(a) a light source for pre-flashing;

(b) a light sensitive element which receives a reflection light resulting from pre-flashing;

(c) an integration circuit connected to said light sensitive element and is arranged to integrate the output of said light sensitive element;

(d) a detection signal forming circuit arranged to detect the output of said integration circuit and to produce a detection signal when the output of said integration circuit reaches a predetermined value;

(e) reducing means for lowering the output of said integration circuit in response to said detection signal; and (f) an aperture determining signal forming circuit arranged to form a signal for determining an aperture value on the basis of the output of the integration circuit and an existence of said detection signal.

6. A flash device comprising:

(a) a light source for pre-flashing;

(b) a light sensitive element which receives a reflection light resulting from pre-flashing;

(c) an integration circuit connected to said light sensitive element and is arranged to integrate the output of said light sensitive element;

(d) an A-D converter circuit arranged to convert the analog output of said integration circuit to a digital signal;

(e) a detection signal forming circuit arranged to produce a detection signal when the output of the A-D converter becomes a predetermined value;

(f) reducing means for lowering the output of said integration circuit in response to said detection signal; and (g) an aperture determining signal forming circuit arranged to form a signal for determining an aperture value on the basis of the A-D converted value from said A-D converter circuit and an existence of said detection signal.

7. A flash device comprising:

(a) a light source for pre-flashing;

(b) a light sensitive element which receives a reflection light resulting from pre-flashing;

(c) an integration circuit connected to said light sensitive element and is arranged to integrate the output of said light sensitive element;

(d) an A-D converter circuit arranged to A-D convert the output of said integration circuit;

(e) a detection signal forming circuit arranged to detect an A-D converted value obtained from said A-D converter circuit and to produce a detection signal when said A-D converted value becomes a predetermined value;

(f) reducing means for lowering the output of said integration circuit in response to said detection signal; and (g) an aperture determining signal forming circuit arranged to form a signal for determining an aperture value on the basis of the A-D converted value from said A-D converter circuit and an existence of said detection signal.

8. A flash device according to claim 5, further comprising:

(a) a flash tube for main flashing;

(b) a stop circuit for stopping said flash tube from illuminating in a main flashing phase, wherein said stop circuit functions when an integrated value by the integration circuit of the output of the light sensitive element which is generated as said element receives reflection light resulting from the main flashing reaches a predetermined trigger value and stops the main flashing; and (c) an adjustment circuit arranged to adjust the trigger value on the basis of the signal from said aperture determining signal forming circuit.

9. A flash device according to claim 6 or 7, further comprising:

(a) a flash tube for main flashing;

(b) a stop circuit arranged to stop said flash tube from illuminating in a main flashing phase, wherein said stop circuits stop the main flashing when an output value of the A-D converter corresponding to an output of said integration circuit out of the output of the light sensitive circuit which is generated as it receives reflection light resulting from the main flashing reaches a predetermined trigger value.

10. A photographic apparatus usable in a flash photographic system of a kind which performs pre-flashing before flash photography, receives a reflection light from an object to be photographed as a result of pre-flashing and determines a flash photographic aperture value on the basis of the quantity of the reflection light received, comprising:

(a) a light sensitive element which receives said reflection light resulting from pre-flashing;

(b) an integration circuit connected to said light sensitive element and is arranged to integrate the output of said light sensitive element;

(c) a detection signal forming circuit arranged to detect the output of said integration circuit and to produce a detection signal when the output of said integration circuit reaches a predetermined value;

(d) reducing means for lowering the output of said integration circuit in response to said detection signal;

(e) an aperture determining signal forming circuit arranged to form a signal for determining an aperture value on the basis of the output of the integration circuit and an existence of said detection signal;

(f) setting means for manually setting a photo-taking aperture value; and (g) selecting means arranged to detect an aperture value determined by said aperture determining signal forming circuit and the aperture value manually set by said setting means and to determine a flash photographic aperture value by selecting one of said two aperture values that represents an aperture value close to a fully open aperture value.

11. A photographic apparatus usable in a flash photographic system of a kind which performs pre-flashing before flash photography, receives a reflection light from an object to be photographed as a result of pre-flashing and determines a flash photographic aperture value on the basis of the quantity of the reflection light received, comprising:

(a) a light sensitive element which receives said reflection light resulting from pre-flashing;

(b) an integration circuit connected to said light sensitive element and is arranged to integrate the output of said light sensitive element;

(c) an A-D converter circuit arranged to convert the analog output of said integration circuit to a digital signal;

(d) a detection signal forming circuit arranged to produce a detection signal when the output of the A-D converter reaches a predetermined value;

(e) reducing means for lowering the output of said integration circuit in response to said detection signal;

(f) an aperture determining signal forming circuit arranged to form a signal for determining an aperture value on the basis of the A-D converted value from said A-D converter circuit and an existence of said detection signal;

(g) setting means for manually setting a photo-taking aperture value; and (h) selecting means arranged to detect an aperture value determined by said aperture determining signal forming circuit and the aperture value manually set by said setting means and to determine a flash photographic aperture value by selecting one of said two aperture values that represents an aperture value close to a fully open aperture value.

12. A photographic apparatus usable in a flash photographic system of a kind which performs pre-flashing before flash photography, receives a reflection light from an object to be photographed as a result of pre-flashing and determines a flash photographic aperture value on the basis of the quantity of the reflection light received, comprising:

(a) a light sensitive element which receives said reflection light resulting from pre-flashing;

(b) an integration circuit connected to said light sensitive element and is arranged to integrate the output of said light sensitive element;

(c) an A-D converter circuit arranged to A-D convert the output of said integration circuit;

(d) a detection signal forming circuit arranged to detect an A-D converted value obtained from said A-D converter circuit and to produce a detection signal when said A-D converted value becomes a predetermined value;

(e) reducing means for lowering the output of said integration circuit in response to said detection signal;

(f) an aperture determining signal forming circuit arranged to form a signal for determining an aperture value on the basis of the A-D converted value from said A-D converter circuit and an existence of said detection signal;

(g) setting means for manually setting a photo-taking aperture value; and (h) selecting means arranged to detect an aperture value determined by said aperture determining signal forming circuit and the aperture value manually set by said setting means and to determine a flash photographic aperture value by selecting one of said two aperture values that represents an aperture value close to a fully open aperture value.

13. A photographic apparatus comprising:
(a) an aperture determining circuit arranged to determine an aperture value for flash photography by pre-flashing;
(b) aperture setting means for manual presetting of a flash photographing aperture value; and
(c) selecting means for selecting as a flash photographic aperture value either the aperture value determined by said aperture determining circuit or the manually preset aperture value whichever represents an aperture value closer to a fully open aperture value.

14. A flash photographic circuit for a camera arranged to perform flash photography using an aperture value set by manual presetting means as a flash photographic aperture value, comprising:
(a) an aperture determining circuit arranged to determine an aperture value for flash photography by pre-flashing; and
(b) aperture selecting means for selecting the aperture value determined by said aperture determining circuit as the flash photographic aperture value in place of the manually preset aperture value when the aperture value determined by said aperture determining circuit represents an aperture value closer to a fully open aperture value than a manually preset aperture value.

15. A photographic apparatus usable in a flash photographic system of a kind which performs pre-flashing before flash photography, receives a reflection light from an object to be photographed as a result of pre-flashing and determines a flash photographic aperture value on the basis of the quantity of the reflection light received, comprising:
(a) a light sensitive element which receives said reflection light resulting from pre-flashing;
(b) an integration circuit connected to said light sensitive element and is arranged to integrate the output of said light sensitive element;
(c) a detection signal forming circuit arranged to detect the output of said integration circuit and to produce a detection signal when the output of said integration circuit reaches a predetermined value;
(d) control means arranged to virtually inhibit the integrating function of said integration circuit in response to said detection signal and to cause the production of an output which corresponds to the brightness of light received by said light sensitive element; and
(e) an aperture determining signal forming circuit arranged to form a signal for determining an aperture on the basis of the output of said integration circuit when said detection is not produced and on the basis of said output corresponding to said brightness when said detection signal is produced.

16. A photographic apparatus usable in a flash photographic system of a kind which performs pre-flashing before flash photography, receives a reflection light from an object to be photographed as a result of pre-flashing and determines a flash photographic aperture value on the basis of the quantity of the reflection light received, comprising:
(a) a light sensitive element which receives said reflection light resulting from pre-flashing;
(b) an integration circuit connected to said light sensitive element and is arranged to integrate the output of said light sensitive element;
(c) an A-D converter circuit which A-D converts the output of said integration circuit;
(d) a detection signal forming circuit arranged to form and produce a detection signal when the value of the A-D conversion output of said A-D converter circuit becomes a predererimined value;
(e) control means arranged to virtually inhibit the integrating function of said integration circuit in response to said detection signal and to cause the production of an output which corresponds to the brightness of light received by said light sensitive element; and
(f) an aperture determining signal forming circuit arranged to form a signal for determining an aperture on the basis of the A-D converted value of the integration output of said integration circuit when said detection signal is not produced and on the basis of the A-D converted value of said output corresponding to the brightness.

17. A photographic apparatus according to claim 15 or 16, wherein said integration circuit has the input terminal thereof connected to said light sensitive element and includes an amplifier which has a capacitor connected to the feedback line thereof; and said control means is arranged to connect a resistor in parallel with said capacitor in response to said detection signal.

18. A flash photographic circuit for a camera arranged to perform flash photography using an aperture value set by manual presetting means as a flash photographic aperture value, comprising:
(a) an aperture determining circuit arranged to determine an aperture value for flash photography by pre-flashing;
(b) a display circuit arranged to display the aperture value determined by said aperture determining circuit or the aperture value set by said presetting means;
(c) a selecting means for selecting a mode of setting an aperture by said presetting means or a mode of automatically setting an aperture by said aperture determining circuit; and
(d) a display control circuit arranged to immediately transmit a set aperture value to said display circuit for displaying when the mode of setting the aperture by said presetting means is selected by said selecting means and to transmit a predetermined aperture value to said display circuit after completion of an aperture determining action of said aperture determining circuit to have the determined aperture value displayed after completion of the aperture determining action when said mode of automatically setting an aperture is selected by said selecting means.

19. In a camera system, an arrangement comprising:
(A) a flash device including:
(a) a light source for pre-flashing;
(b) a light sensitive element which receives a reflection light resulting from pre-flashing;
(c) an integration circuit connected to said light sensitive element and is arranged to integrate the output of said light sensitive element;

(d) a detection signal forming circuit arranged to detect the output of said integration circuit and to produce a detection signal when the output of said integration circuit reaches a predetermined value;

(e) reducing means for lowering the output of said integration circuit in response to said detection signal; and (f) an aperture determining signal forming circuit arranged to form a signal for determining an aperture value on the basis of the output of said integration circuit and an existence of said detection signal; and (B) a camera including an aperture control circuit arranged to perform aperture control on the basis of the signal from said aperture determining signal forming circuit.

20. In a camera system, an arrangement comprising:
(A) a flash device including:
  (a) a light source for pre-flashing;
  (b) a light sensitive element which receives a reflection light resulting from pre-flashing;
  (c) an integration circuit connected to said light sensitive element and is arranged to integrate the output of said light sensitive element;
  (d) an A-D converter circuit arranged to convert the analog output of said integration circuit to a digital signal;
  (e) a detection signal forming circuit arranged to detect the output of said A-D converter circuit reaches a predetermined value;
  (f) reducing means for lowering the output of said integration circuit in response to said detection signal; and
  (g) an aperture determining signal forming circuit arranged to form a signal for determining an aperture value on the basis of the A-D converted value from said A-D converter circuit and an existence of said detection signal;
(B) a camera including an aperture control circuit arranged to perform aperture control on the basis of the signal from said aperture determining signal forming circuit.

21. In a camera system, an arrangement comprising:
(A) a flash device including:
  (a) a light source for pre-flashing;
  (b) a light sensitive element which receives a reflection light resulting from pre-flashing;
  (c) an integration circuit connected to said light sensitive element and is arranged to integrate the output of said light sensitive element;
  (d) an A-D converter circuit arranged to convert the analog output of said integration circuit;
  (e) a detection signal forming circuit arranged to detect an A-D converted value obtained from said A-D converter circuit and to produce a detection signal when said A-D converted value becomes a predetermined value;
  (f) reducing means for lowering the output of said integration circuit in response to said detection signal; and
  (g) an aperture determining signal forming circuit arranged to form a signal for determining an aperture value on the basis of an A-D converted value from said A-D converter circuit and an existence of said detection signal;
(B) a camera including an aperture control circuit arranged to perform aperture control on the basis of the signal from said aperture determining signal forming circuit.

* * * * *